June 9, 1959 T. F. SCREVEN 2,890,413
SWITCHING PANEL FOR TESTING WATTHOUR METERS
Filed Oct. 1, 1956 2 Sheets-Sheet 1
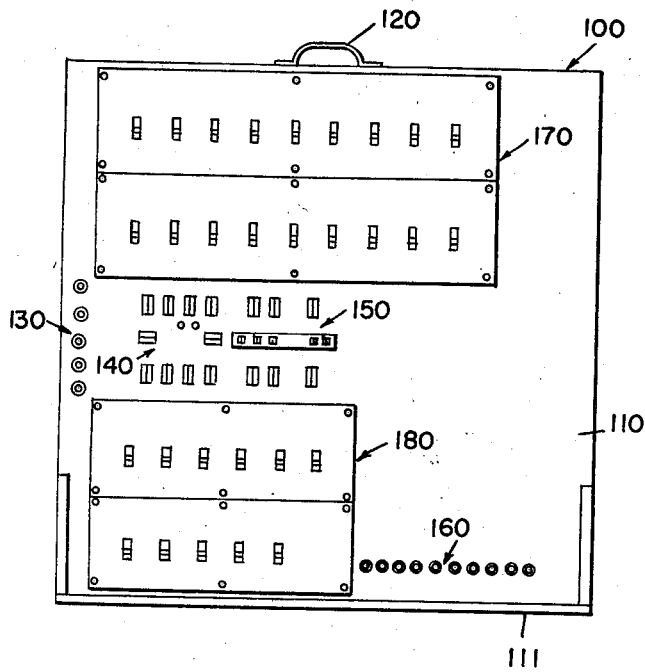
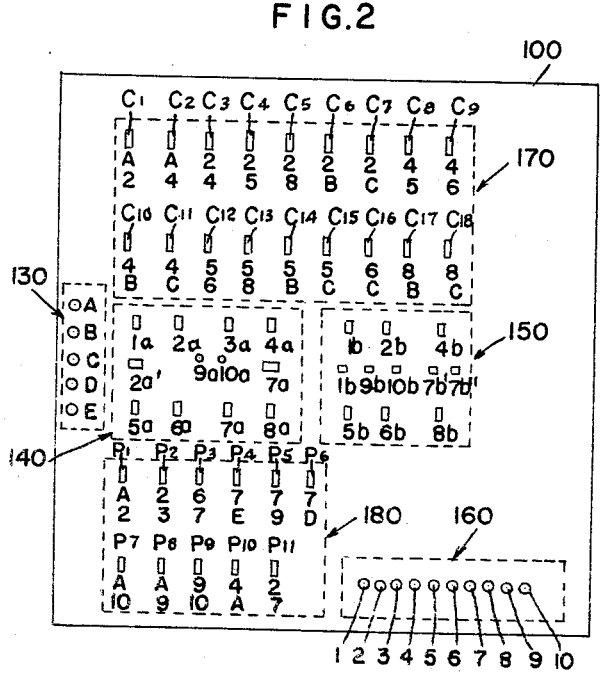
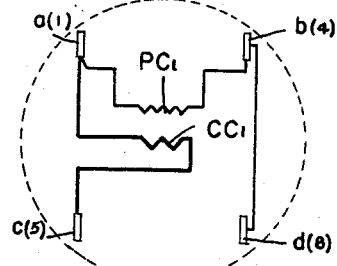
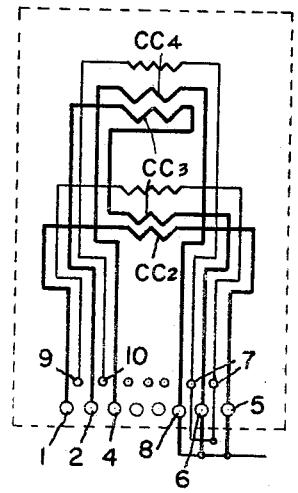
INVENTOR.
Thomas F. Screven
BY Ralph B. Stewart
ATTY

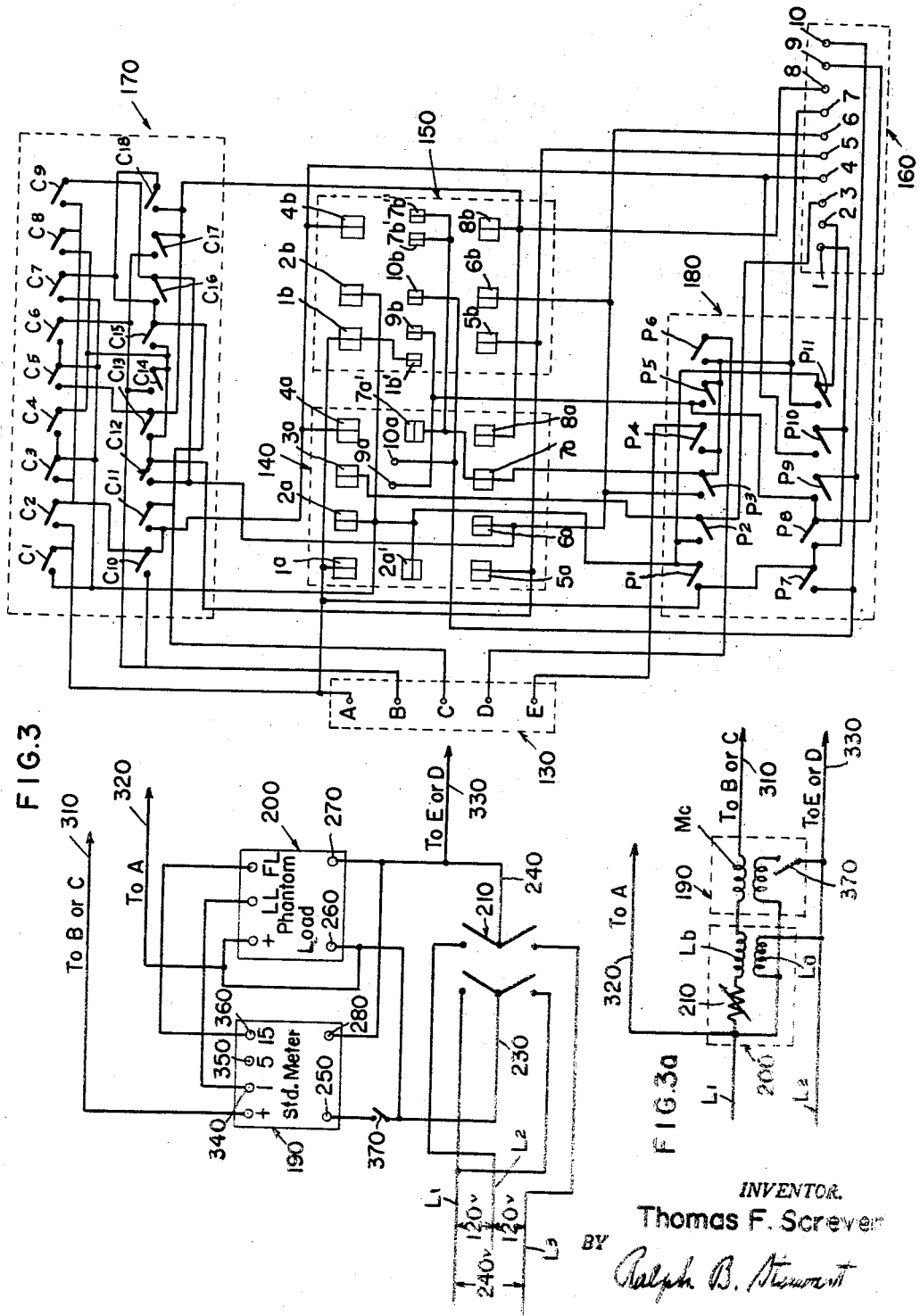
June 9, 1959
T. F. SCREVEN
2,890,413
SWITCHING PANEL FOR TESTING WATTHOUR METERS
Filed Oct. 1, 1956
2 Sheets-Sheet 2
INVENTOR.
Thomas F. Screven
BY United States Patent Office 2,890,413
Patented June 9, 1959

2,890,413

SWITCHING PANEL FOR TESTING WATTHOUR METERS

Thomas F. Screven, Atlanta, Ga.

Application October 1, 1956, Serial No. 613,276

3 Claims. (Cl. 324—74)

This invention relates to improvements in devices for testing watthour meters, and is particularly adapted for testing meters of many different types while at the same time enabling such tests to be made easily and practically.

At the present time, there are a very great number of different types of watthour meters in use, some of which utilize plug-in connection with mounting sockets and others of which are of the so-called A base bottom-connected type wherein the connections to the meter are made through the medium of a plurality of terminal posts mounted at the base of the meter. In order to properly test and service these different types of meters, the individual performing the testing and servicing must be familiar with the internal circuits of all the various types of meters, and since there is such a large number of various types, it is becoming increasingly difficult to obtain personnel having sufficient experience to properly test and service these various types of meters. Consequently, it is a primary object of this invention to provide a testing panel or board which, in conjunction with a set of printed instructions, will permit the service personnel to perform the necessary tests on a watthour meter without having knowledge of the particular circuitry of the meter being tested. This invention also involves the use of at least one set of socket-type terminals forming a meter socket in which plug-in type of meters may be tested and, in addition thereto, a group of terminal posts identified in a manner corresponding to the identification of the terminals of the A base bottom-connected meters, so that both socket-base and A base meters may be tested.

The testing device or panel forming this invention embodies a first set or group of terminal posts which are adapted to be connected to any conventional type of standard watthour meter and associated artificial or phantom load device, or an equivalent or similar testing assembly, and, in conjunction with this group of terminals, a second set or group of terminals which are adapted to be connected to the meter being tested, there being a plurality of normally open, independently and manually operable switches interposed in the connections between the first and second sets of terminals so that upon closing predetermined and prearranged combinations of the switches, connections are completed between the two sets of terminals in accordance with the particular circuitry of the meter being tested so that such meter may be calibrated against the standard meter in accordance with conventional test procedure. Further, the switches are so arranged that in those meters which utilize more than one current coil, different sequences of switching arrangements may be utilized to individually test the current coils, to test two or more of the current coils is series relation, and to test individual pairs of the coils in bucking relation.

A further object of the invention is to devise a testing panel by which numerous makes of plug-in type meters may be tested by the use of only two meter sockets permanently built into the panel, thus avoiding the use of separate plug-in sockets which have been used heretofore.

A preferred embodiment of the invention is illustrated in the accompanying drawing in which:

Figure 1 is an elevational view of the front face of the test panel or board constructed in accordance with this invention;

Figure 2 is a diagrammatic view of the test panel in which the electrical connections between the various component parts are diagrammatically illustrated;

Figure 3 is a circuit diagram of the test panel;

Figure 3a is a simplified diagram of the phantom load and standard meter;

Figure 4 is a circuit diagram of a Westinghouse type CS single phase watthour meter, two wire, self-contained; and Figure 5 is a circuit diagram of a Westinghouse type CA-8 watthour meter, three phase, four wire wye, transformer type.

Referring now more particularly to Figure 1, the reference numeral 100 indicates the testing device in its entirety, which will be seen to consist essentially of a suitable mounting panel 110 which preferably is made of light-weight material so as to be easily transported. Preferably, the panel 110 is supported vertically upon a base board 111 and is provided with a suitable handle 120. Mounted on this panel are a first group of terminals 130 comprising five posts which are designated A, B, C, D, and E, respectively, and which are to be connected, as will be later described, to an associated standard testing device. The board carries at least one other set or group of terminals which are to be connected directly to a meter to be tested. In the particular board or panel shown, there are three additional groups of meter terminals designated respectively by the reference characters 140, 150 and 160. The terminals of group 140 form a meter socket for plug-in type meters, and group 150 forms a second meter socket, the terminals of the two meter sockets being distinguished by the letters (*a*) and (*b*) associated with the reference numerals.

Those terminals of the group 140 (meter socket A) which are designated in Figure 2 by the reference characters 1*a* to 8*a*, 2*a'* and 7*a'* are all of the female or socket type adapted to receive the prongs of a socket-base or plug-in type meter which is to be tested. The terminals 9*a* and 10*a* are spring loaded plungers or contact points projecting out from the panel which establish electrical connections with certain connection straps mounted on the backs of meters which must be tested with this group of terminals. The terminals in socket A are arranged to be used with various plug-in meters provided with 4 to 8 prongs or blades. Thus, socket A will accommodate the following types of plug-in meters:

*Single element meters*

Single phase, 2 wire, 120 volt, 4 terminal meter self con.
Single phase, 2 wire, 120 volt, 5 terminal meter trans. type
Single phase, 3 wire, 240 volt, 4 terminal meter self con.
Single phase, 3 wire, 240 volt, 5 terminal meter trans. type
Single phase, 3 wire, 240 volt, 6 terminal meter trans. type

*Two element meters*

3 phase or net work, 3 wire, 120 volt, 5 terminal meter self con.
3 phase, 3 wire, 240 volt, 5 terminal meter self con.
3 phase, 3 wire, 120 volt, 8 terminal meter self con. or trans.
3 phase, 3 wire, 240 volt, 8 terminal meter self con. or trans.
3 phase 4 wire delta 240 volt, 7 terminal meter self con.

2½ element meter 3 phase 4 wire wye 120/208 volt, 7 terminal meter self contained

3 element meter 3 phase 4 wire wye 120/208 volt, 7 terminal meter self contained Terminal group 150, forming meter socket B will accommodate all plug-in meters having thirteen prongs or blades, but only eleven being used for testing. These are 3-phase, 4-wire, transformer meters made with 2, 2½ and 3 elements.

In the various groups of terminals 140, 150 and 160, all common or similar terminals are designated by identical numerals in the reference characters, and it is to be understood that identically numbered terminals in these three groups are connected together, as will be seen by reference to the circuit diagram shown in Figure 3. For example, terminals 1a, 1b, 1b' and 1 are all connected together by permanent connections.

The testing device as described so far consists essentially of a first group of post terminals designated by the reference characters A, B, C, D, and E, two sets of meter socket terminals 140 and 150, and another set of post terminals 160. Now, whereas the first-mentioned group of terminals 130 individually designated A, B, C, D and E are adapted to be connected to a standard testing assemblage such as a watthour meter standard and associated phantom or artificial load, the additional groups of terminals 140, 150 and 160 are adapted to be connected with corresponding terminals of the meter being tested, both groups of terminals 140 and 150 being for use with plug-in type meters with socket bases, whereas the group of terminals 160 are to be used for testing A base, bottom-connected meters.

With the exception of those terminals in groups 140, 150 and 160 designated by the reference characters 1a, 1b, 1b' and 1, all of which are connected directly to the terminal designated A in the first group 130, there are no direct connections between the terminals of the groups 140, 150 and 160 on the one hand, and the terminals of the first group 130 on the other hand. However, for the purpose of connecting the various other terminals of the groups 140, 150 and 160 to the first-mentioned group 130, and to so connect the same in prearranged manners in accordance with the circuitry of the particular meter being tested, there are provided two groups of normally open and independently operable switches which are designated by the reference characters 170 and 180. The switches of the group 170 may be called "current" switches and are individually numbered by the reference characters C1–C18, inclusive, whereas the switches of the group 180 may be designated "potential" switches and are individually designated by the reference characters P1–P11, respectively. It will be noted that the switches in group 170 control connections which carry the load current, while the switches in group 180 control connections which apply potential to various terminals.

As shown in Figure 2, each individual switch element is provided with two reference characters directly therebelow which indicate the connections of the switch which are normally open but which are bridged when the individual switches are closed, and these reference characters correspond either to the designation of the terminal groups 140, 150 and 160, or the terminal group 130. For example, the switch C1 connects on one side to the terminal 1 of the group 160 and on the other side to the terminal 2 of the group 160 and since the terminal 1 is directly connected to terminal A in the group 130, closing of switch C1 operates to connect the common terminals A and 1 to all of the terminals 2 of the groups 140, 150 and 160, that is, to terminals 2a, 2a', 2b and 2.

As shown in Figure 3, one set of switches P1, P10, P8 and P7 connect terminal A separately to terminal posts 2, 4, 9 and 10, respectively. Switches C1 and C2 also connect terminal A with posts 2 and 4, respectively. A second set of switches C6, C10, C14 and C17 connect terminal B separately to terminal posts 2, 4, 5 and 8, respectively. A third set of switches C7, C11, C15, C16 and C18 connect terminal C to posts 2, 4, 5, 6 and 8, respectively. A fourth set of switches P2, C3, C4, P11 and C5 connect terminal post 2 to posts 3, 4, 5, 7 and 8, respectively. The remaining switches P6, P4, C8, C9, C12, C13, P3, P5 and P9 connect together the posts of the following pairs: D and 7, E and 7, 4 and 5, 4 and 6, 5 and 6, 5 and 8, 6 and 7, 7 and 9, and 9 and 10.

For greatest flexibility in testing, it is preferred to equip the panel with all of the switches illustrated in the drawing. However, the panel could be simplified and used with less flexibility by omitting switches C6, C10, C14, C17 and P4, and using only terminals A, C and D.

As will be noted from Figure 3, the standard testing assemblage which is to be connected with the various terminals of the group 130 may consist of a standard watthour meter 190 and an artificial or phantom load device 200. The power source is obtained from the lines L1, L2 and L3 with 240 volts being available across lines L1 and L3 and 120 volts available between either of the lines L1 or L3 and the line L2. A double-pole, double-throw switch 210 is connected with the lines L1, L2 and L3 to selectively obtain either 120 or 240 volts across the two conductors 230 and 240. The conductor 230 is connected to terminals 250 and 260 of the phantom load device 200 and the standard meter 190 respectively, whereas the conductor 240 is connected to the terminals 270 and 280 of the standard meter and phantom load device, respectively, and each of these devices has a switch incorporated therein to change over from 120 to 240 volt operation.

The two + terminals on the standard meter 190 and the phantom load device 200 designate the common current and potential connection terminals of these two devices, and the two conductors 310 and 320 leading therefrom are adapted for connection to certain of the terminals of the group 130 on the testing board or panel. The conductor 320 is always connected to the terminal A, whereas the conductor 310 is connected to either the terminal B or the terminal C dependent, respectively, upon whether 240 or 120 volt testing is desired. The third connection which is made to the group of terminals 130 is the conductor 330 which is connected to either the terminal D or the terminal E for 120 or 240 volt testing respectively. The LL and FL on the phantom load 200 are for light load and full load ampere operation, respectively, and connect to corresponding terminals 340, 350 or 360 of the standard meter 190, these latter terminals in the particular device shown having an output of one, five and fifteen amperes, respectively.

A starting and stopping switch 370 is interposed in the connection to the potential coil of the standard meter 190 for the purpose of permitting the operator to control the starting and stopping of the meter during testing.

Figure 3a is a simplified diagram showing the manner in which the standard meter 190 and the phantom load 200 is connected to supply lines L1—L2 and to terminals A to E, respectively. Conductors 320 and 330 supply potential to the meter under test through common terminal A and either terminal D for 120 volt operation or terminal E for 240 volt operation. Conductors 310 and 320 supply current to the meter under test through common terminal A and either terminal B for 240 volt testing or terminal C for 120 volt testing. The current coils of the meter under test and the standard meter are energized at low voltage by a step-down transformer embodied in the phantom load and having a primary winding La and a secondary winding Lb. The phantom load also includes a variable resistor 210 which is connected between conductors 320 and 310 in series with secondary Lb and the current coil Mc of the standard meter 190.

In one conventional load device, resistor 210 is varied in five steps to provide five different current values at both light-load and full-load testing.

In using the device, standard testing procedures are utilized, and by way of example, reference is made more particularly to Figures 3 and 4, the latter figure indicating the standard circuit diagram for a Westinghouse type CS single phase watthour meter. In Figure 4, reference characters a, b, c and d designate the respective prongs on the base of this type of meter which are to be connected in association with the group of terminals 140 and which prongs respectively connecte with the socket terminals 1a, 4a, 5a and 8a of meter socket A. The internal circuitry of the meter is as shown, with the potential coil being designated by the reference character PC1 and the current coil being designated by the reference character CC1.

For testing the various types of meters which may be tested on the particular panel above described, the operator refers to printed tables for the various types of meters, each given table for a particular meter having instructions for closing certain combinations of switches 170 and 180 to make the necessary tests. In testing the meter shown in Figure 4, the table for that particular meter or series of meters directs the operator to close the two potential switches P6 and P11. Since the particular type of meter shown in Figure 4 is of the 120 volt type, conductor 320 will be connected to terminal A, conductor 310 will be connected to terminal C, and conductor 330 will be connected to terminal D. Since the two switches P6 and P11 have common connection to terminal 7 and since they respectively are also connected to terminals D and 2, the net effect of closing this combination of potential switches is to connect terminal D to socket contact 2 and thence to one side of switch C3. Since this particular type of meter contains but a single current coil CC1, connected between socket contacts 1a and 5a, only one test is to be made, and the reference table indicates that the second sequence or combination of switches to be closed are current switches C3 and C15. Closing current switch C3 establishes electrical connection between terminal 4a and terminal D through switches P6 and P11, thereby applying line potential to meter coil PC1 connected across socket contacts 1a and 4a, the net effect being to directly connect prong b of the meter shown in Figure 4 to the D terminal which is in turn connected to the conductor 330. Closing of current switch C15 establishes a direct connection between socket contact 5a and terminal C and since contact 5a in the group 140 receives the prong c of the meter in Figure 4, the current coil CC1 is connected through conductors 310 and 320 to the secondary Lb or phantom load 200 in series with the current coil Mc of standard 190 and resistor 210 of load 200. The service meter is then calibrated by comparison with the standard meter, that is, the angular velocities of the disks of the service meter and the standard meter are compared, all as is conventional in the usual testing procedures wherein the percent accuracy of the service meter may be determined.

By way of further example, reference is made to Figures 3 and 5, respectively, the latter of which shows a Westinghouse type CA polyphase watthour meter of the three phase, four wire wye, transformer type, operating on 120 volts. Since this meter is of the A base bottom-connected type, the group of terminals 160 must be utilized in conjunction therewith, and for the purpose of providing a convenient support for the meter, a suitable hook may be provided on the face of the panel or board 110 on which the meter is suspended during testing.

In Figure 5, the terminals at the base of the meter which are to be connected to the various terminals of the group 160 are designated with identical reference characters with those terminals to which they are to be connected. In the printed instruction table corresponding to this type of meter, potential switches P6, P7 and P8 are first to be closed and this combination of switches connect together terminals 7 and D, A and 10, and A and 9, respectively. To test the current coil CC2 of the meter, current switch C15 is closed, directly connecting terminal 5 to terminal C and the calibration of the service meter disk with this current coil energized is accomplished in the usual manner. Upon the completion of this test, current switch C15 is opened and the two current switches C1 and C16 are closed which operate to connect terminal 2 to terminal A and terminal 6 to terminal C, thus completing the circuit through the current coils CC3 for testing this portion of the meter in the standard manner. To test the remaining current coil CC4, the switches C1 and C16 are opened and switches C2 and C18 are closed which connect terminals 4 to A and terminals 8 to C, completing the circuit through current coil CC4 and the test thereof is made in the usual manner.

To test the several current coils in series, switches C3, C12 and C18 are closed, which will be seen to serially connect the coils CC2, CC3 and CC4 across the two terminals A and C. Comparison of the service meter with the standard meter is then made in the usual manner.

To test coils CC4 and CC2 in bucking relation, current switches C11 and C13 are closed and of course in this test any rotation of the service meter disk indicates an unbalanced condition between these two coils. In this particular type of meter, only these two current coils need be tested in bucking relation since in testing current coil CC3, the same is calibrated with current coils CC2 and CC4 and hence further calibration of this coil CC3 is unnecessary.

From the above examples, it will be evident that the potential switches which are closed in any one series of tests remain closed throughout the tests and it is only the current switches which are changed for the individual tests as is clear from the second example above. Broadly speaking, the potential switches prepare the circuitry of the testing panel for subsequent completion by the individual or combination of current switches which are subsequently closed.

In the above examples, only the terminal groups 140 and 160 were specifically referred to, but it is to be understood that the group 160 is to be used with all A base bottom-connected meters, whereas the group 140 is adaptable to certain types of socket base meters, whereas the group 150 is adaptable to other types of socket base meters, with the combination of all three of these groups permitting testing of almost all existing types of meters.

Whereas only two instruction tables are given above for two particular types of meters, it will be seen that compilation of tables for various types of meters is only a matter of knowing the internal circuits of the meters in which case the combinations of potential and current switches may be readily determined.

I claim:

1. A switching panel for the testing of watthour meters comprising a set of ten terminal posts identified as 1 to 10, respectively, and adapted to be connected to the terminals of meters to be tested, a second set of five terminal posts identifiable as A to E, to be connected to a supply line a test load and a standard meter, an electric connection joining post A to post 1 directly, a set of switches for separately connecting post A to posts 2, 4, 9 and 10, respectively, a second set of switches for separately connecting post B with posts 2, 4, 5 and 8, respectively, a third set of switches for separately connecting post C with posts 2, 4, 5, 6 and 8, respectively, a fourth set of switches for connecting post 2 with posts 3, 4, 5, 7 and 8, respectively, and separate switches for connecting together the posts of the pairs D and 7, E and 7, 4 and 5, 4 and 6, 5 and 6, 5 and 8, 6 and 7, 7 and 9, and 9 and 10.

2. A switching panel for the testing of watthour meters comprising a set of ten terminal posts identifiable as 1 to 10, respectively, and adapted to be connected to the terminals of meters to be tested, a second set of three terminal posts identifiable as A, C and D, terminal A forming a common terminal for a supply line a test load and a standard meter, terminal C forming a current terminal for the standard meter and test load to be connected between this terminal and terminal A, and terminal D forming the potential terminal of the supply line, an electric connection joining post A to post 1 directly, a set of switches for separately connecting post A to posts 2, 4, 9 and 10, respectively, a second set of switches for separately connecting post C with posts 2, 4, 5, 6 and 8, respectively, a third set of switches for connecting post 2 with posts 3, 4, 5, 7 and 8, respectively, and separate switches for connecting together the posts of the pairs D and 7, 4 and 5, 4 and 6, 5 and 6, 5 and 8, 6 and 7, 7 and 9, and 9 and 10.

3. In a testing device for watthour meters, a base, a first group of terminals on said base, predetermined terminals of said group to be connected to a supply line, a load and standard watthour meter assembly, a second group of terminals on said base in the form of socket members arranged in sub-groups, the socket members of one sub-group being different at least in number, size or spacing from those in another sub-group to respectively receive the terminal prongs of watthour meters, of corresponding number, size or shape, the first and second mentioned groups of terminals being electrically interconnected and there being interposed in such connections two groups of normally open, individually manually operable switches, the first group of switches being adapted when closed in predetermined combinations to prepare the circuitry of the testing device for prearranged connections between the first mentioned predetermined terminals and the individual socket members of a predetermined sub-group upon closing of predetermined combinations of the second group of the switches in accordance with the electrical connections of the meter being tested.

References Cited in the file of this patent

UNITED STATES PATENTS

| | | |
|---|---|---|
| 2,241,181 | Bushnell | May 6, 1941 |
| 2,255,122 | Markley | Sept. 9, 1941 |
| 2,688,117 | Knopp | Aug. 31, 1954 |